United States Patent
Robinson et al.

(10) Patent No.: US 10,503,494 B1
(45) Date of Patent: Dec. 10, 2019

(54) GRANULAR OR PARTIAL LOCKING WITHIN AN APPLICATION

(71) Applicant: Progress Software Corporation, Bedford, MA (US)

(72) Inventors: Matthew Robinson, Saratoga, CA (US); Pavel Vorobiev, Foster City, CA (US)

(73) Assignee: Infinite Blue IP, LLC, Collegeville, PA (US)

( * ) Notice: Subject to any disclaimer, the term of this patent is extended or adjusted under 35 U.S.C. 154(b) by 0 days.

(21) Appl. No.: 14/505,269

(22) Filed: Oct. 2, 2014

Related U.S. Application Data

(60) Provisional application No. 61/886,929, filed on Oct. 4, 2013, provisional application No. 61/887,021, filed on Oct. 4, 2013.

(51) Int. Cl.
*G06F 8/70* (2018.01)

(52) U.S. Cl.
CPC ...................... *G06F 8/70* (2013.01)

(58) Field of Classification Search
CPC ..... G06F 8/20; G06F 8/36; G06F 8/71; G06F 8/70
USPC ........................................................ 717/120
See application file for complete search history.

(56) References Cited

U.S. PATENT DOCUMENTS

| | | | |
|---|---|---|---|
| 5,892,510 A | 4/1999 | Lau | |
| 6,564,223 B1 | 5/2003 | Sexton | |
| 7,003,587 B1 | 2/2006 | Battat et al. | |
| 7,296,028 B1 | 11/2007 | Ivanova | |
| 7,606,888 B2 * | 10/2009 | Tanner et al. | 709/223 |
| 8,930,766 B2 * | 1/2015 | Griesinger et al. | 714/38.1 |
| 2002/0062317 A1 | 5/2002 | Wakai et al. | |
| 2003/0093436 A1 | 5/2003 | Brown et al. | |
| 2004/0036719 A1 | 2/2004 | Van Treeck | |
| 2004/0133444 A1 * | 7/2004 | Defaix | G06F 8/71 717/122 |
| 2005/0005264 A1 | 1/2005 | Gurevich | |
| 2005/0188349 A1 | 8/2005 | Bent | |
| 2006/0015840 A1 * | 1/2006 | Marvel | G06F 8/20 717/101 |

(Continued)

OTHER PUBLICATIONS

Filemaker Platform "Combining Two or More Fields into a Single Field—Concatenations Explained" FileMaker Community, dated May 3, 2005, 2 pages.

(Continued)

*Primary Examiner* — Chat C Do
*Assistant Examiner* — Bradford F Wheaton
(74) *Attorney, Agent, or Firm* — Patent Law Works LLP

(57) ABSTRACT

A system and method for receiving a selection from a developer, the selection determining a locking status of a component of a web-based application being developed using the model driven development application; applying the locking status to the component of a web-based application being developed using the model driven development application; and publishing the web-based application with locking information for installation by another tenant upon completion of the web-based application's development, the locking information determining what components of the web-based application may be modified by the another tenant based on their locking status during development.

15 Claims, 4 Drawing Sheets

(56) References Cited

U.S. PATENT DOCUMENTS

| | | | |
|---|---|---|---|
| 2009/0055799 A1* | 2/2009 | Cao | G06F 8/71 |
| | | | 717/111 |
| 2009/0063559 A1 | 3/2009 | Rhodes et al. | |
| 2009/0164521 A1* | 6/2009 | Lo et al. | 707/104.1 |
| 2011/0119651 A1* | 5/2011 | Utschig-Utschig et al. | |
| | | | 717/107 |
| 2011/0153576 A1 | 6/2011 | Figus | |
| 2012/0089499 A1* | 4/2012 | Balthaser | G06F 17/24 |
| | | | 705/35 |
| 2012/0137272 A1* | 5/2012 | Kemmler | G06F 8/65 |
| | | | 717/124 |
| 2014/0032725 A1 | 1/2014 | Solovey et al. | |

OTHER PUBLICATIONS

Lawton, George, "Developing Software Online with Platform-as-a-Service Technology," dated Jun. 2008, IEEE, pp. 13-15.
Vorobiev et al, "Rollbase in Action," dated 2011, 29 pages. Best Copy Available.
"Rollbase Launches Version 3.3 of its Cloud Application Conversion Tool," <http://www.cloudcomputingdevelopment.net! ro llbase-lau nch es-ve rs io n -3-3-of -its-cloud-application-conversion-tool/>, dated Jan. 16, 2012, p. 1-2.

* cited by examiner

GRANULAR OR PARTIAL LOCKING WITHIN AN APPLICATION

RELATED APPLICATIONS

This application claims the benefit of U.S. Provisional Application No. 61/886,929, filed on Oct. 4, 2013, and titled "Granular or Partial Locking within an Application," and U.S. Provisional Application No. 61/887,021, filed on Oct. 4, 2013, and titled "External Objects for a Model-Driven Application Development System," which are herein incorporated by reference in their entirety.

FIELD OF INVENTION

The present disclosure relates to application development. More specifically, the present disclosure relates to the model driven development of an application and the ability for a customer or end-user to modify and customize that application.

BACKGROUND

A recent trend has been for applications to be implemented and available in the "cloud." A first problem with present systems for generating and managing such web-based applications (e.g. SaaS applications) is that present systems require a great deal of coding by a developer and fail to provide a "what you see is what you get" development environment, in which a developer is able to interact with and define the application and its components graphically, with little to no coding, and may see what that web-based application or component will look like upon deployment and use by an end-user throughout the development phase.

A second problem with present systems for generating and managing such web-based applications (e.g. SaaS applications) is that present systems do not provide a library of web-based applications published and shared by developers or models available for use or inclusion in other web-based applications.

A third problem with present systems for generating and managing such web-based applications (e.g. SaaS applications) is that present systems do not provide a developer a partial locking mechanism for controlling subsequent users' (e.g. a customer, an end-user, another developer seeking to incorporate published web-application into another web-application, etc.) ability to modify or customize that application at various levels of granularity.

SUMMARY

In one embodiment, an application (e.g. a web-based application) and its components may be locked and unlock at various levels of granularity by a locking module. In one embodiment, the locking module determines the unlocking/locking based on user input received from a user developing the application using the model-driven development application. In one embodiment, an application is neither entirely locked nor entirely unlocked. Such an application is referred to as "partially locked." The effects of locking, unlocking and partial locking relate to an end-user's ability to modify and customize the application and a developer's ability to update the application without the risk of over-writing an end-user's customizations. In one embodiment, the locking module may partially lock an application at one or more levels of granularity. For example, in one embodiment, a tab within the application may be individually unlocked/locked (i.e. a second level of locking), a menu below the tab or a submenu below another menu may be individually unlocked/locked (i.e. a third level of locking), a component of an object (e.g. a field) may be individually unlocked/locked (i.e. a fourth level of locking) and a relationship between objects may be unlocked/locked (i.e. a fifth level of locking).

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
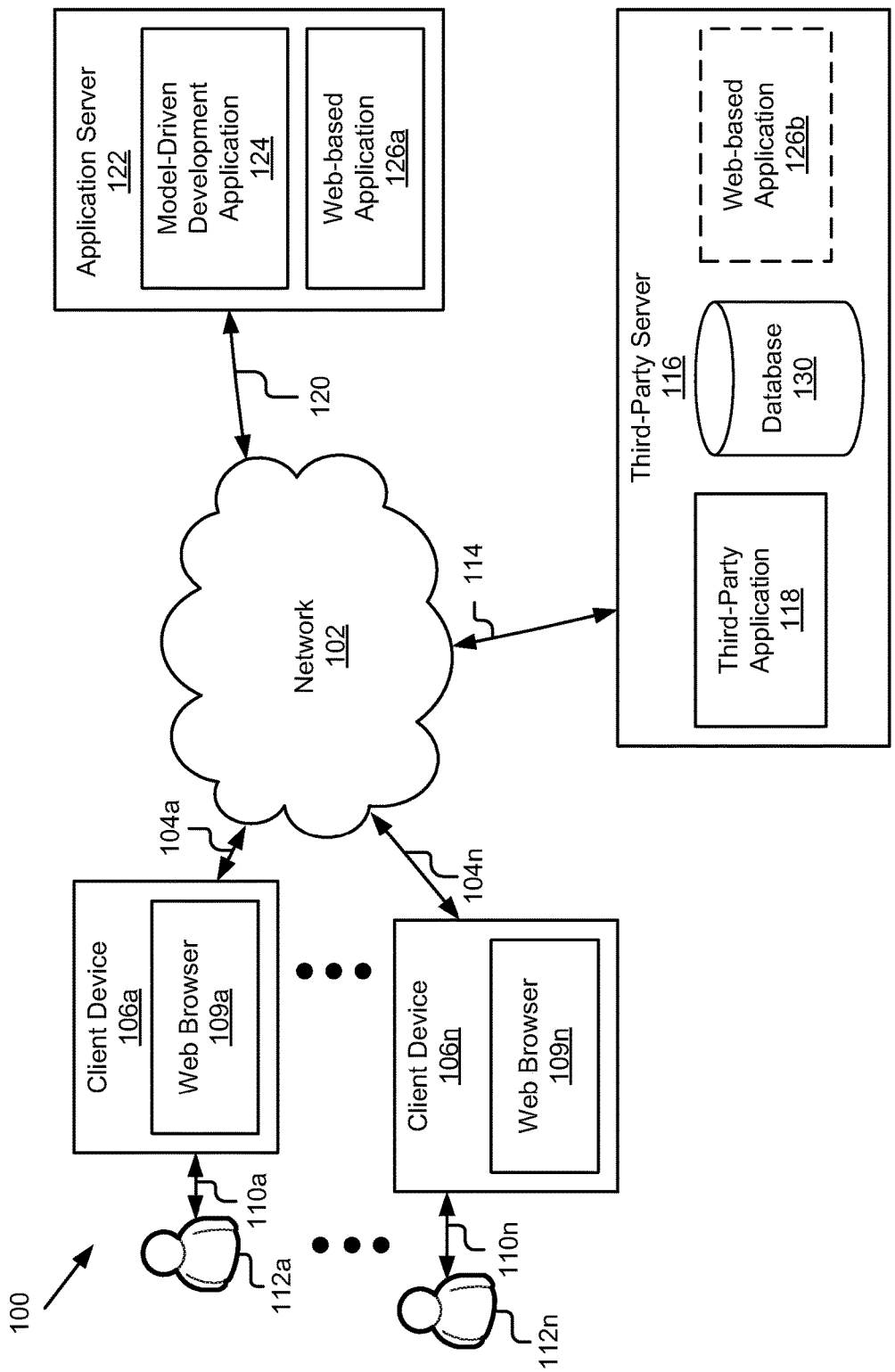
FIG. 1 is a block diagram illustrating an example system for granular locking of an application according to one embodiment.

FIG. 1 is a block diagram illustrating an example system 100 for granular locking of an application according to one embodiment. The illustrated system 100 includes client devices 106*a* . . . 106*n*, a third-party server 116, an application server 122, which are communicatively coupled via a network 102 for interaction with one another. For example, the client devices 106*a* . . . 106*n* may be respectively coupled to the network 102 via signal lines 104*a* . . . 104*n* and may be accessed by users 112*a* . . . 112*n* (also referred to individually and collectively as user 112) as illustrated by lines 110*a* . . . 110*n*. The third-party server 116 may be coupled to the network 102 via signal line 114. The application server 122 may be coupled to the network 102 via signal line 120. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), Java DataBase Connectivity (JDBC), Open DataBase Connectivity (ODBC), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies (e.g. proprietary binary representations) instead of, or in addition to, the ones described above. Depending upon the embodiment, the network 102 can also include links to other networks.

The client devices 106a . . . 106n (also referred to individually and collectively as client device 106) are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices.

In the depicted implementation, the client devices 106a . . . 106n respectively contain instances 109a . . . 109n of a web browser 109 (also referred to individually and collectively as web browser 109). The web browser 109 may be storable in a memory (e.g., similar to that shown in FIG. 2) and executable by a processor (e.g., similar to that shown in FIG. 2) of a client device 106 to provide for user interaction, receive user input, present information to the user via a display, and send data to and receive data from the other entities of the system 100 via the network 102. For example, the web browser 109 may be operable for presenting user interfaces. For example, in one embodiment, the web browser 109 may present user interfaces such as an interface displaying components of an object of an application and one or more selection elements that may indicate and/or be used to modify a locking status associated with one or more components, based on graphical data received from the model-driven development application 124 of the application server 122 via the network 102. In some embodiments, the client device 106 may also include applications (not shown) for making phone calls, video calls, messaging, social networking, gaming, capturing digital video, and/or images, authoring documents, etc.

The third-party server 116 and the application server 122 may include one or more computing devices having data processing, storing, and communication capabilities. For example, these entities 116, 122 may include one or more hardware servers, server arrays, storage devices, systems, etc., and/or may be centralized or distributed/cloud-based. In some implementations, these entities 116, 122 may include one or more virtual servers, which operate in a host server environment and access the physical hardware of the host server including, for example, a processor, memory, storage, network interfaces, etc., via an abstraction layer (e.g., a virtual machine manager).

In one embodiment, the model-driven development application 124, which may occasionally be referred to herein as the "development application 124," allows a user to build a web-based application 126 on top of the services provided by the third party application 118 without writing much code. For example, the development application 124 allows a user to build a web-based application 126 that uses the services provided by third party application 118 and/or data in an external database (e.g. database 130). For example, the third-party server 116 includes a legacy database system in database 130 and existing application logic in the third-party application 118.

In one embodiment, a third-party server 116 may include the web-based application 126b developed and published using the development application 124 of the application server 122. For example, in one embodiment, the web application 126b was developed and published by Company A using the development application 124 then installed and deployed on a server operated by or on behalf of Company A (i.e. a company associated with, or operating, the third-party server 116).

It should be understood that the system 100 illustrated in FIG. 1 is representative of an example system for granular locking of an application according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
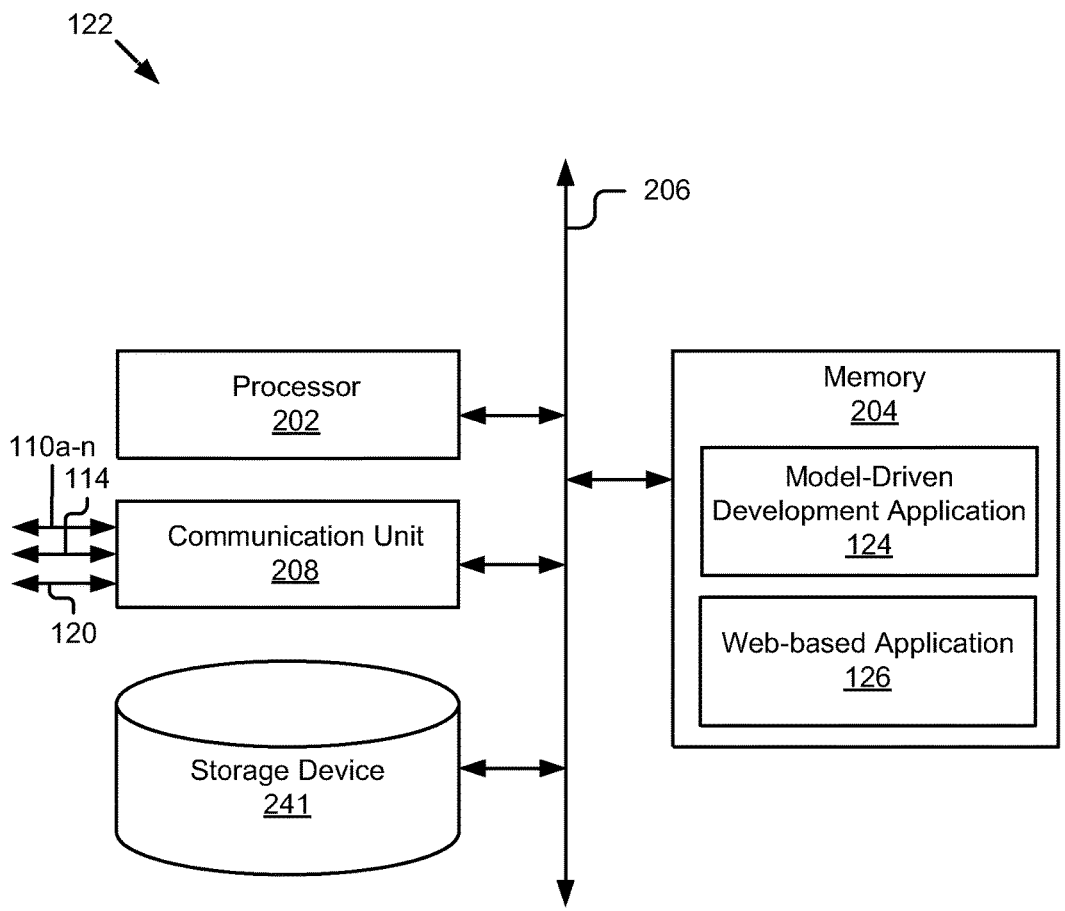
FIG. 2 is a block diagram illustrating an example application server according to one embodiment.

FIG. 2 is a block diagram of an example application server 122 according to one embodiment. The application server 122, as illustrated, may include a processor 202, a memory 204, a communication unit 208, and a storage device 241, which may be communicatively coupled by a communications bus 206. The application server 122 depicted in FIG. 2 is provided by way of example and it should be understood that it may take other forms and include additional or fewer components without departing from the scope of the present disclosure. For example, while not shown, the application server 122 may include input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein can be applied to multiple entities in the system 100 with various modifications, including, for example, the third-party server 116 (e.g. by omitting the development application 124) and a client device 106 (e.g. by omitting the development application 124 and web-based application 126 and including a web browser 109).

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the application server 122 including, for example, the memory 204, communication unit 208, and the storage device 241.

The memory 204 may store and provide access to data to the other components of the application server 122. In some implementations, the memory 204 may store instructions and/or data that may be executed by the processor 202. For example, as depicted, the memory 204 may store the development application 124 and the web-based application 126. The memory 204 is also capable of storing other instructions and data, including, for example, an operating system, hardware drivers, software applications, databases, etc. The memory 204 may be coupled to the bus 206 for communication with the processor 202 and the other components of the application server 122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of an application server 122 or between computing devices 106/116/122, a network bus system including the network 102 or portions thereof, a processor mesh, a combination thereof, etc. In some implementations, the development application 124, its sub-components 320, 322, 324, 326, 328, 330 and various software operating on the application server 122 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSL, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 103, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The storage device 241 is an information source for storing and providing access to data. In some implementations, the storage device 241 may be coupled to the components 202, 204, and 208 of the computing device via the bus 206 to receive and provide access to data. In some implementations, the storage device 241 may store data received from the model-driven development application 124, the user devices 106, and the third-party server 116 of the system 100, and provide data access to these entities. The data stored on the storage device 241 may vary depending on the embodiment. For example, in one embodiment, the storage device 241 includes a database of models available to the model-driven development application 124 for possible inclusion into a web-based application 126. In another example, in one embodiment, the storage device 241 includes an existing database including a table. For example, in one embodiment, the storage device 241 includes an existing database that is wrapped by an external object (discussed below) of the web-based application 126. In another embodiment, the existing database wrapped by an external database does not reside on the same device as the development application 124 and/or web-based application 126. For example, in one embodiment, an existing database wrapped by an external object of the web-based application 126 is included in database 130 associated with a third party server 116.

The storage device 241 may be included in the application server 122 and/or a storage system distinct from but coupled to or accessible by the application server 122. The storage device 241 can include one or more non-transitory, computer-readable mediums for storing the data. In some implementations, the storage device 241 may be incorporated with the memory 204 or may be distinct therefrom. In some implementations, the storage device 241 may include a database management system (DBMS) operable on the application server 122. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations. In one embodiment, the database 130 of FIG. 1 is similar to the storage device 241 of the application server 122.

As mentioned above, the application server 122 may include other and/or fewer components. Examples of other components may include a display, an input device, a sensor, etc. (not shown). In one embodiment, the application server 122 includes a display. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the application server 122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Model-Driven Development Application 124

Figure 3:
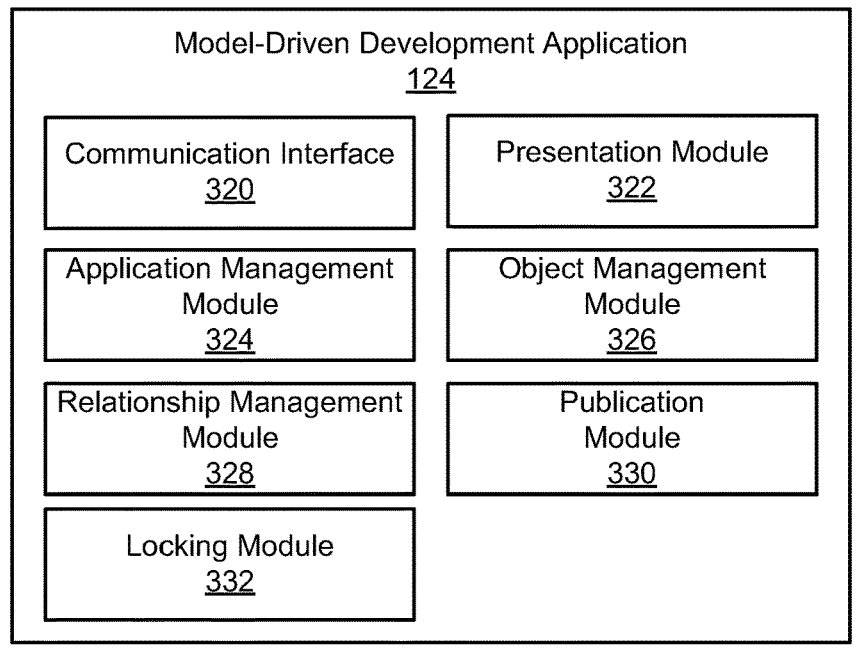
FIG. 3 is a block diagram illustrating an example of a model-driven development application according to one embodiment.

Referring now to FIG. 3, the model-driven development application 124 is shown in more detail according to one embodiment. FIG. 3 is a block diagram of the model-driven development application 124 included in an application server 122 according to one embodiment.

The model-driven development application 124 is a model-driven application platform for finding, creating and/or customizing web-based applications 126. In some embodiments, the model-driven development application 124 is web-based and may be accessed by any number of users 112 from a web browser 109 (e.g. Internet Explorer, Firefox, Google Chrome, Safari, etc.). In one embodiment, the development application 124 allows a user to create and customize web-based database applications using Object Oriented programming concepts using point-and-click and drag-and-drop without the programming that traditionally accompanies such endeavors. For example, the development application 124 allows a user to build and deploy a custom web-based application 126 on top of on-demand, web-based services without writing much code.

In one embodiment, the development application 124 is a web-based application platform for object based creation of web-based applications 126. The object based creation of a web-based application involves minimal coding by the user building the application 126, since the user does not write the code that defines the object. In one embodiment, the development application 124 displays representations of objects, which are building blocks of the web-based application 126, in tabs and menus in order to facilitate navigation and organization. Representations of the various components comprising the definition of the object are also displayed. In one embodiment, definition of the objects and relations between the objects may be created and modified when the user interacts with fields, check boxes, wizards, etc. via a graphical user interface (GUI). Therefore, in one embodiment, the user building the web-based application 126 may build an entire, complex web-based application 126 using point-and-click and drag-and-drop without writing a line of code. The user defines what he or she wants using a GUI and the coding/programming implementation is handled by the development application 124 on the back-end without user intervention.

In one embodiment, the object based creation of a web-based application 126 enables a "what you see is what you get" development environment, in which the user is able to interact with and define the application and its components (e.g. objects) graphically and see what the application or component will look like upon deployment and use of the web-based application 126. For example, in one embodiment, the user is able to define a "contact" object to include fields (e.g. address, e-mail, phone numbers, etc.) in a certain layout using the development application 124, and when an end-user accesses an instance of a contact using the web-based application 126, the layout of that contact instance is visually the same as that displayed during development of the object. Generally, as used in reference to FIGS. 3-5, the term "user" refers to a user 112 that is developing the web-based application 126 using the development application 126 and an "end-user" or "customer" refers to a user 112 of the web-based application 126 upon deployment of the web-based application 126 unless a contrary interpretation is clear from the context.

In one embodiment, the development application 124 comprises a communications interface 320, a presentation module 322, an application management module 324, an object management module 326, a relationship management module 328, a publication module 330 and a locking module 332. It will be recognized that the modules 320, 322, 324, 326, 328, 330, 332 comprised in the development application 124 are not necessarily all on the same application server 122. In one embodiment, the modules 320, 322, 324, 326, 328, 330, 332 and/or their functionality are distributed across multiple application servers 122.

The communication interface 320 includes code and routines for handling communications between the presentation module 322, the application management module 324, the object management module 326, the relationship management module 328, the publication module 330, the locking module 332, other components of the application server 122 and other components of the system 100. In one embodiment, the communication interface 320 is a set of instructions executable by the processor 202. In another embodiment, the communication interface 302 is stored in the memory 204 and is accessible and executable by the processor 202. In either embodiment, the communication interface 320 is adapted for cooperation and communication with the processor 202, other components of the application server 122 (e.g. via bus 206), other components of the system 100 (e.g. another computing device 106a/106n/122/116 via communications unit 208), and other components of the development application 124.

The communication interface 320 handles communications between the presentation module 322, the application management module 324, the object management module 326, the relationship management module 328, the publication module 330, the locking module 332 and other components of the application server 122. For example, the communication interface 320 communicates with the object management module 326 and the presentation module 322 to pass the output of the object management module 326 (e.g., object information) to the presentation module 322. However, this description may occasionally omit mention of the communication interface 320 for purposes of clarity and convenience. For example, for purposes of clarity and convenience, the above scenario may be described as the object management module 326 passing object information to the presentation module 322.

The presentation module 322 includes code and routines for generating graphical data for presentation to a user. In one embodiment, the presentation module 322 is a set of instructions executable by the processor 202. In another embodiment, the presentation module 322 is stored in the memory 204 and is accessible and executable by the processor 202. In either embodiment, the presentation module 322 is adapted for cooperation and communication with the processor 202, other components of the application server 122 and other components of the development application 124.

The presentation module 322 generates graphical data for presentation to a user. Examples of graphical data may be used to present one or more of various GUIs (e.g. GUIs that allows a user to visually build a web-based application 126 via a web browser 109 without writing much code).

In one embodiment, the presentation module 322 generates graphical data for displaying a GUI on a display of a client device 106. For example, the presentation module 322 generates graphical data for displaying a GUI on a client device 106 via web browser 109 that includes a graphical representation of a selection element associated with the locking of the web-based application 126 or a component thereof. For example, the presentation module 322 generates graphical data that when presented by the client device 106 displays a check box next to an object field (i.e. a component of a web-based application 126) which may be checked to lock the object field and unchecked to unlock the object field by a user interacting with the GUI. In one embodiment, the presentation module 322 is responsible for generating graphical data for the user interfaces described throughout this specification. For clarity and convenience, the specification occasionally omits mention of the presentation module 322. For example, the preceding example may be described as the locking module 332 receiving user input selecting a selection element associated with an object component and unlocking/locking the object component based on the user input.

In one embodiment, the presentation module 322 passes the graphical data for presentation. For example, the presentation module 322 is communicatively coupled to a client device 106 to send the graphical data for presentation at the client device 106 via a web browser 109. In another embodiment, the presentation module 322 stores the graphical data in the storage device 241 (or any other non-transitory storage medium communicatively accessible), and the graphical data may be retrieved by accessing the storage device 241 (or other non-transitory storage medium).

The application management module 324 includes code and routines for managing the development of one or more applications. In one embodiment, the application management module 324 is a set of instructions executable by the processor 202. In another embodiment, the application management module 324 is stored in the memory 204 and is accessible and executable by the processor 202. In either embodiment, the application management module 324 is adapted for cooperation and communication with the processor 202, other components of the application server 122 and other components of the development application 124.

The application management module 324 manages the development of one or more applications. In one embodiment, the application management module 324 manages the creation and modification of components of the web-based application 126. In one embodiment, an application is a grouping of one or more of models, objects, tabs and portals. The one or more objects, tabs and portals are occasionally referred to herein as components of a web-based application 126. In one embodiment, the application management module 324 may create one or more of a new object, new tab and new portal. In one embodiment, the application management module 324 may modify the groupings of objects, tabs and portals. For example, the application management module 324 may remove an object from the web-based application 126.

The application management module 324 allows a user to manage the grouping of the models, objects, tabs and portals that comprise the web-based application 126. A model is a collection of one or more objects with predefined attributes, relationships and complex business logic. A model may serve as a template or starting point for application development and may be modified, customized and combined with other models or application components using the development application 124 to build a web-based application 126. For example, a model may include an "employee" model, which may include fields for identifying that person (e.g. FirstName, LastName, title, SocialSecurityNumber, etc.) and contacting that person (e.g. home address, personal e-mail address, cell phone number, work address, work e-mail, work phone number, etc.) and human resource information (e.g. salary/wages, vacation hours, sick days, etc.) as a preexisting model. This "employee" model may be dragged and dropped into a web-based application 126 thereby reducing the burden on the user (e.g. reducing the number of objects the user creates and defines) and thereby accelerating the development of the web-based application 126. For example, the user need not create an "employee" object and defining each object component (e.g. a field for each of FirstName, LastName . . . cell phone number . . . salary/wages . . . and so forth) because the model already exists and may be modified by the user if necessary for inclusion in the web-based application 126.

In some embodiments, the models may be tiered, or related, for example, a "Payroll" model may include instances of the "employee" model to generate a table that provides a total cost of salaries for a given pay period for a given group of employees (e.g. salaried and/or hourly). By providing predefined models to use as a starting point, the development application 124 is "model-driven" and may beneficially enable a user to more rapidly develop a web-based application 126. In one embodiment, the business logic of a model may be manipulated using tools such as advance business language (ABL) and end-to-end application coding. In one embodiment, the models are stored in a database associated with the development application 124, for example, the models are stored in a database (not shown) in the memory 204 and/or storage device 241 of the application server 122.

An object is a data structure that is the core component of a web-based application 126. A tab is the core navigational component and allows navigation among the various components (e.g. portals and objects) of the web-based application 126. In one embodiment, a tab is a clickable (i.e. selectable using an input device such as a mouse) section header below an application header bar of the web-based software application 126 being developed using the development application 124. In one embodiment, a tab is a top-level navigational component and zero or more menus, which are also clickable section headers, may be created and organized hierarchically below the tab. In one embodiment, when the application management module 324 creates a new object, the application management module 324 creates a new tab for that object, which may be nested in another tab as a child and become a menu. For example, assume a tab has two menus, in one embodiment, the first menu may include additional menus each associated with one or more objects and the second menu may be associated with one or more objects. A portal is an access mechanism for customers and external entities into the web-based application 126. Additional information about objects, tabs and portals may be found in P. Vorobiev and M. Robinson, Rollbase in Action, Progress Software, 2013, which is incorporated by reference in its entirety herein.

In one embodiment, a component of a web-based application may be associated with a locking selection element, which allows the user to select whether that component and the sub-components thereof (depending on the embodiment) are locked by the locking module 332 (discussed below). For example, in one embodiment, application management module 324 associates a selection element, which is selectable by a user, with one or more of a tab, a menu, an object and a portal, and when selected via user input causes the locking module 322 to unlock/lock the associated tab, menu, object or portal and (depending on the embodiment) the subcomponents thereof. Examples of a locking selection element may include but are not limited to a radio button, a checkbox, a button, an icon, etc.

Figure 4:
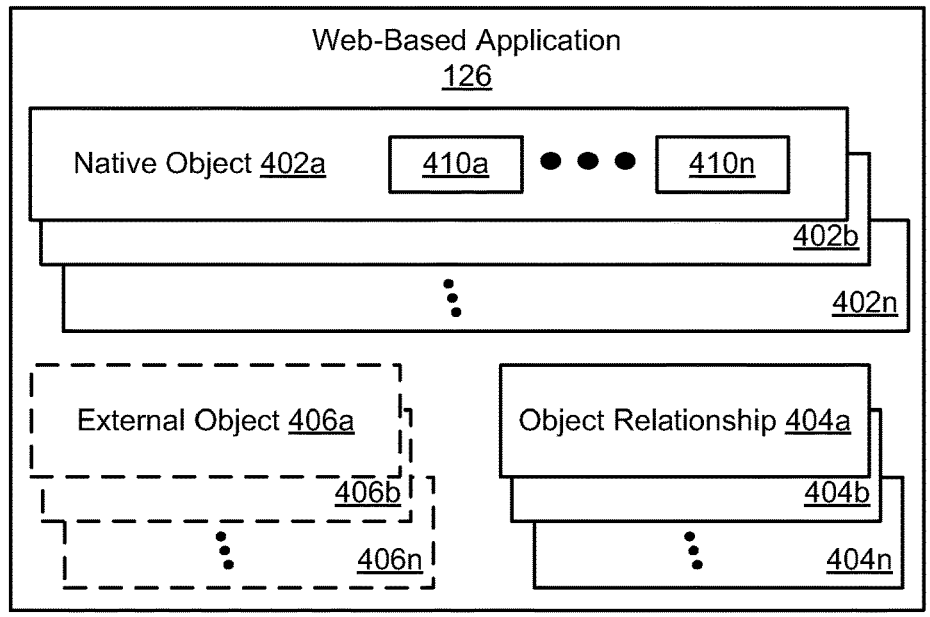
FIG. 4 is a block diagram illustrating an example of a web-based application according to one embodiment.

Referring to FIG. 4, an example of a web-based application 126 is illustrated according to one embodiment. In the illustrated embodiment, the web-based application 126 includes one or more objects (e.g. native objects 402a-n and, optionally, external objects 406a-n) as well as object relations 404a-n between the one or more objects. In one embodiment, as is described below in detail, the application management module 324 creates an object 402/406, the object management module 326 defines whether the object is a native object 402 or an external object 406, the object management module 326 defines the components 410a-n of each native object 402, and the relationship management module 328 creates a relationship between one or more objects 402/406.

Referring again to FIG. 3, in one embodiment, the application management module 324 stores the objects, tabs and portals that comprise the web-based application 126 in the storage device 241 (or any other non-transitory storage medium communicatively accessible). The other modules of the development application 124 including, e.g., the object management module 326 and/or the relationship management module 328, can retrieve the one or more objects by accessing the storage device 241 (or other non-transitory storage medium).

The object management module 326 includes code and routines for managing one or more objects. In one embodiment, the object management module 326 is a set of instructions executable by the processor 202. In another embodiment, the object management module 326 is stored in the memory 204 and is accessible and executable by the processor 202. In either embodiment, the object management module 326 is adapted for cooperation and communication with the processor 202, other components of the application server 122 and other components of the development application 124.

As previously mentioned, an object 402/406 is a core component of a web-based application 126 and may represent any kind of data. For example, an object may be defined to represent entities (e.g. partners, companies, employees, customers, contacts, etc.), events (e.g. meetings, conferences, etc.), work products (e.g. quotes, invoices, purchase orders, etc.), things (e.g. assets, projects, etc.), comments, reports, requests, ratings, or any other data.

In some embodiments, there are different classifications of objects. For example, in one embodiment, an object may be classified as a "native" object 402 or as an "external" object 406. A native object 402 is an object that is created and defined by the development application 124 and the data associated with the native object 402 is also stored locally for example as part of the local memory 204 or local database (e.g. storage device 241).

A native object 402 serves as a template for an object record. An object record is an actual, in-use instance of a native object 402. For example, an "Employee" native object 402 serves as a template for employee records, where each object record (i.e. employee record) represents an actual employee. In one embodiment, a native object 402 may serve as a visual template of how an object record appears to a user of a web-based application 126 in-use. For example, a native object 402 provides a template for the visual layout of native object components 410 (e.g. fields) associated with an object record (e.g. an employee record) that are presented to an end-user of the web-based application 126 via a browser 109 in-use of the web-based application 126. Such an embodiment may beneficially provide for developing objects in which what you see during development is what you get upon deployment.

The object management module 326 manages the definition of an object. A native object 402 may have one or more components that define the native object 402. Examples of native object components include, but are not limited to properties, attributes, fields, relationships, pages, views, etc., which define the content and behavior of the native object 402. Additional information about properties, attributes, fields, relationships, pages, views, etc. may be found in P. Vorobiev and M. Robinson, Rollbase in Action, Progress Software, 2013, which is incorporated by reference in its entirety herein.

In one embodiment, each component of an object may be individually unlocked/locked. In one embodiment, an object component may be associated with a locking selection element, which allows the user to select whether that component is locked by the locking module 332 (discussed below). For example, in one embodiment, the object management module 326 associates a selection element, which is selectable by a user, with one or more object components (e.g. fields), and when selected via user input causes the locking module 322 to unlock/lock the associated object component (e.g. field). For example, in one embodiment, the object management module 326 receives user input selecting a selection element via a GUI displayed by a web browser 109 on a client device 106 indicating that a first field is to be locked and a second field is to be unlocked and sends that information to the locking module 332.

An external object 406 is an object that points to or "wraps" an external database or data service for use of one or more of a field, an attribute, a record, or any other characteristic of the database in the web-based application 126 being developed by the development application 124. In one embodiment, an external object 406 has similar features to a native object 202, but the actual data remains stored in the original table or external data store rather than in a table "native" to the development application 124 or web-based 126 application.

In one embodiment, responsive to the application management module 324 creating an object, the object management module 326 receives user input indicating that the newly created object is to be an external object 406 and an identification of the external, existing database or data service. For example, the object management module 326 receives a selection of "external database" or "external service" made using a drop down menu and determines that the object is to be defined as an external object 406.

Upon defining the object as an external object 406, the object management module 326 maps the columns in the selected external database or data service, which is occasionally referred to herein as a "target" database or data service, or as an "existing" database or data service, to fields in the external object 406. For example, the object management module 326 maps the columns in the existing database to fields by generating a list of the columns in the existing database with an associated field type (e.g. checkbox, text area, text, ID, date, decimal, etc.) and a label for that field. In one embodiment, the object management module 326 defines the field type based on a user's selection in a pull down menu of a GUI presented to the user and defines the field label based on user input typed into a box in a GUI presented to the user. The process of mapping the columns of an existing database to fields and field labels of the external object is occasionally referred to as "wrapping" the existing database/table.

In one embodiment, the use of an external object 406 may beneficially require less time than recreating the target of the external object 406 using one or more native objects 402. In one embodiment, the use of an external object 406 may also beneficially provide ongoing use and sharing of the target's data. For example, when the external database implemented using an external object 406 is updated by the service associated with that external database, the web-based application 126 immediately has access to the updated target, while a database recreated using native object(s) 402 may not be updated or must wait for a synchronization or update process to occur (e.g. import the updated table). Therefore, the use of an external object 406 allows for migration of an existing, legacy, database-driven enterprise software into a cloud-native solution without changing database schema or migrating data.

In one embodiment, the object management module 326 stores the object definitions in the storage device 241 (or any other non-transitory storage medium communicatively accessible). The other modules of the development application 124 including, e.g., the relationship management module 328, can retrieve object definitions by accessing the storage device 241 (or other non-transitory storage medium).

The relationship management module 328 includes code and routines for managing the relationships 404 between objects. In one embodiment, the relationship management module 328 is a set of instructions executable by the processor 202. In another embodiment, the relationship management module 328 is stored in the memory 204 and is accessible and executable by the processor 202. In either embodiment, the relationship management module 328 is adapted for cooperation and communication with the processor 202, other components of the application server 122 and other components of the development application 124.

In order to build a sophisticated web-based application 126, relationships 404 between objects 402/406 need to be created and managed. The relationship management module 328 manages such relationships 404 including the creation and modification of those relationships 404. For example, assume an invoice includes one or more line items and that the web-based application 126 includes a "line item" object and an "invoice" object; in one embodiment, the relationship management module 328 manages a relationship 404 between the "line item" and "invoice objects" so that an invoice which may be presented to the user (i.e. an instance of the invoice object/an invoice object record) includes one or more line items (i.e. one or more instances of the line item object/one or more instances of the line item object record).

In one embodiment, the relationship management module 328 manages any number of relationships 404 between objects 402/406. For example, the relationship management module 328 manages one or more of one-to-one relationships, one-to-many relationships, many-to-one relationships, many-to-many relationships and hierarchical relationships between objects. In one embodiment, the relationship management module 328 stores relationships as foreign keys within the native object or external object itself—this supports one-to-one relationships, one-to-many relationships and many-to-one relationships.

In one embodiment, a relationship may be unlocked/locked. In one embodiment, a relationship is associated with a locking selection element, which allows the user to select whether that relationship is locked by the locking module 332 (discussed below). For example, in one embodiment, the relationship management module 328 associates a selection element, which is selectable by a user, with one or more relationships, and when selected via user input causes the locking module 322 to unlock/lock the associated relationship. For example, in one embodiment, the relationship management module 328 receives user input selecting a selection element via a GUI displayed by a web browser 109 on a client device 106 indicating that a first relationship is to be locked and a second relationship is to be unlocked and sends that information to the locking module 332.

In one embodiment, the relationship management module 328 stores the relationships 404 in the storage device 241 (or any other non-transitory storage medium communicatively accessible). The other modules of the development application 124 including, e.g., the presentation module 322 and/or the publication module 330, can retrieve the relationships 404 by accessing the storage device 241 (or other non-transitory storage medium).

The locking module 332 includes code and routines for unlocking/locking one or more components of a web-based application 126 at one or more levels of granularity. In one embodiment, the locking module 332 is a set of instructions executable by the processor 202. In another embodiment, the locking module 332 is stored in the memory 204 and is accessible and executable by the processor 202. In either embodiment, the locking module 332 is adapted for cooperation and communication with the processor 202, other components of the application server 122 and other components of the development application 124.

In one embodiment, the locking module 322 determines whether a web-based application 126 or a component thereof is unlocked or locked based on whether a locking selection element, occasionally referred to herein as a "selection element," associated with that web-based application 126 or component thereof has been selected by a user.

In one embodiment, the web-based application 126 and its components may be locked and unlock at various levels of granularity by a locking module 332. In one embodiment, the locking module 332 determines the unlocking/locking based on user input received from a user developing the web-based application 126 using the development application 124. For example, in one embodiment, the locking module 332 unlocks/locks the web-based application 126 as a whole, which may be referred to herein as a first level of locking, responsive to a user selecting to do so using a locking selection element associated with the web-based application 126 by the application management module 324. In one embodiment, when the web-based application 126 as a whole is locked, all the components of the web-based application 126 are also locked and the web-based application 126 is a locked application. In one embodiment, when the web-based application 126 as a whole is unlocked, all the components of the web-based application 126 are also unlocked and the web-based application 126 is an unlocked application. In one embodiment, a web-based application 126 is neither entirely locked nor entirely unlocked. Such a web-based application 126 is referred to as "partially locked." The effects of locking, unlocking and partial locking are discussed below with reference to publishing and the publication module 330.

In one embodiment, the locking module 332 may partially lock a web-based application 126 at one or more levels of granularity. In one embodiment, the locking module 332 may partially lock a web-based application 126 at one or more levels of granularity within a hierarchical structure of the web-based application 126. For example, in one embodiment, a tab within the web-based application 126 may be individually unlocked/locked (i.e. a second level of locking), a menu below the tab or a submenu below another menu may be individually unlocked/locked (i.e. a third level of locking), a component of an object (e.g. a field) may be individually unlocked/locked (i.e. a fourth level of locking) and a relationship between objects may be unlocked/locked (i.e. a fifth level of locking). For example, assume a web-based application 126 includes a first tab that includes a first menu associated with a first object and a second menu associated with a second object. In one embodiment, the locking module 332 may unlock/lock the first tab, which unlocks/locks the components and subcomponents of that first tab (i.e. the menus and the associated objects are unlocked/locked). In one embodiment, the locking module 332 may lock the first menu and unlock the second menu, which locks the components of the first menu including the first object and unlocks the components of the second menu including the second object accordingly.

In one embodiment, when the locking module 332 unlocks/locks a component of the web-based application 126, the locking module 332 may lock or unlock all the subcomponents of that component. For example, assume an the locking module 332 locks an object based on user input; in one embodiment, the locking module 332 locks all the components of that object (e.g. fields). In another example, assume a tab is locked by the locking module 332 based on user input; in one embodiment, any menus, objects and object components associated with that tab are locked by the locking module 332. In one embodiment, all components of a web-based application 126 are unlocked by default. In one embodiment, all components of a web-based application 126 are locked by default. In one embodiment, some components of a web-based application 126 may be locked by default and others may be unlocked by default.

The locking module 322 maintains locking information. Locking information includes information about the lock status (i.e. locked or unlocked) of the web-based application 126 and the components thereof. For example, the locking module 322 may maintain locking information in the form of a hierarchical tree structure, table, nested list, etc. indicating which if any components of the web-based application 126 are locked and/or unlocked.

In one embodiment, the locking module 332 stores the locking information in the storage device 241 (or any other non-transitory storage medium communicatively accessible). The other modules of the development application 124 including, e.g., the presentation module 322 and/or the publication module 330, can retrieve the relationships 404 by accessing the storage device 241 (or other non-transitory storage medium).

The publication module 330 includes code and routines for publishing a web-based application 126. In one embodiment, the publication module 330 is a set of instructions executable by the processor 202. In another embodiment, the publication module 330 is stored in the memory 204 and is accessible and executable by the processor 202. In either embodiment, the publication module 330 is adapted for cooperation and communication with the processor 202, other components of the application server 122 and other components of the development application 124.

The publication module 330 publishes the web-based application 126. Publication of the web-based application 126 allows the application to be distributed and installed into other tenants of the application server 122 or onto other servers (e.g. a third party server 116). Publication facilitates the distribution of a web-based application 126 developed using the development application 124. For example, publication allows a developer of a web-based application 126 to license or sell the web-based application 126 for installation and use by others. In another example, publication allows a developer of a web-based application 126 to contribute the web-based application 126 to a collection or library of web-based applications that may be shared, used and/or modified by others.

In one embodiment, the publication module 330 publishes the web-based application by making it available to other tenants of the application server 122 who may install, use, and modify a published version of the web-based application 126 subject to the locking statuses associated with web-based application and the components thereof. In one embodiment, the locking information is associated with a published application. For example, in one embodiment, the publication module 330 creates an instance of the web-based application 126 that is available to other tenants using the development application 124 and includes information about which components, if any, of that instance of the web-based application are locked/unlocked.

In one embodiment, the publication module 330 publishes the web-based application by serializing (i.e. saving) the web-based application into an Extensible Markup Language (XML) file. In one embodiment, the publication module 330 publishes the web-based application by serializing (i.e. saving) the web-based application 126 into a proprietary XML file. In one embodiment, the XML file includes information regarding the locking status (i.e. locked/unlocked) of each component of the web-based-application 126.

In one embodiment, when generating the XML all objects explicitly assigned to the web-based application (including all of their subcomponents such as fields, view, pages, document templates, etc.) are included into the XML and all objects related to any explicitly assigned tabs are included as well.

The published code may then be shared with and installed by other tenants. The locking, unlocking and partial locking affects users of a published web-based application 126 (e.g. installed from the published XML code). A web-based application 126 installed from a published version of the web-based application 126 is occasionally referred to herein as a "published application." Locking prohibits an administrative end-user of a published application from modifying the locked portion(s) of the published application. A fully locked published application may be desirable if the developer of the published application would like to retain complete control over all aspects of the applications. For example, assume the developer intends to provide updated versions of the published application in the future; in one embodiment, it may be desirable to fully lock the application so that future updates may safely overwrite existing components of the published application (otherwise there is the potential an update would overwrite any customizations a customer made to the application). A fully unlocked application allows administrative users of the published application to modify all components of the published application using the development application 124. A partially locked application allows administrative users of the published application to modify unlocked portions of the published application but not locked portions of the published application. Partial locking may be desirable when a developer of the web-based application 126 intends to provide updates to certain components of the application but not others.

In one embodiment, enforcement of the lock is performed by an enforcing module (i.e. the module 324/326/328 of the development application 124 that manages the component of the published web-based application 126 that a user is seeking to modify). For example, assume the published web-application includes an object component (e.g. a field) a user would like to modify and the published application includes locking information indicating that object component (e.g. that field) is locked; in one embodiment, since the object management module 326 manages the definition of object components (e.g. fields), the object management module 326 check locking information associated with the component, determines that object component is locked and denies the request to modify that object component. In another example, assume a user would like to modify a locked tab in a published application; in one embodiment, the application management module 324, similar to the example above, denies the request to modify the tab. In yet another example, assume a user would like to modify a locked relationship in a published application; in one embodiment, the relationship management module 328, similar to the example above, denies the request to modify the relationship. It will be recognized the preceding is merely one mechanism for enforcement and other mechanisms for enforcement exist.

In one embodiment, the publication module 330 stores the XML for the web-based application 126 in the storage device 241 (or any other non-transitory storage medium communicatively accessible). The XML for the web-based application 126 can retrieve by accessing the storage device 241 (or other non-transitory storage medium). For example, the XML for the published web-based application may be retrieved from the storage device 214 of the application server 122 and installed into the third-party server 116 (e.g. web-based application 126b of FIG. 1) or installed by another tenant of the application server 122 and used or further developed by a user associated with that tenant.

Example Methods

Figure 5:
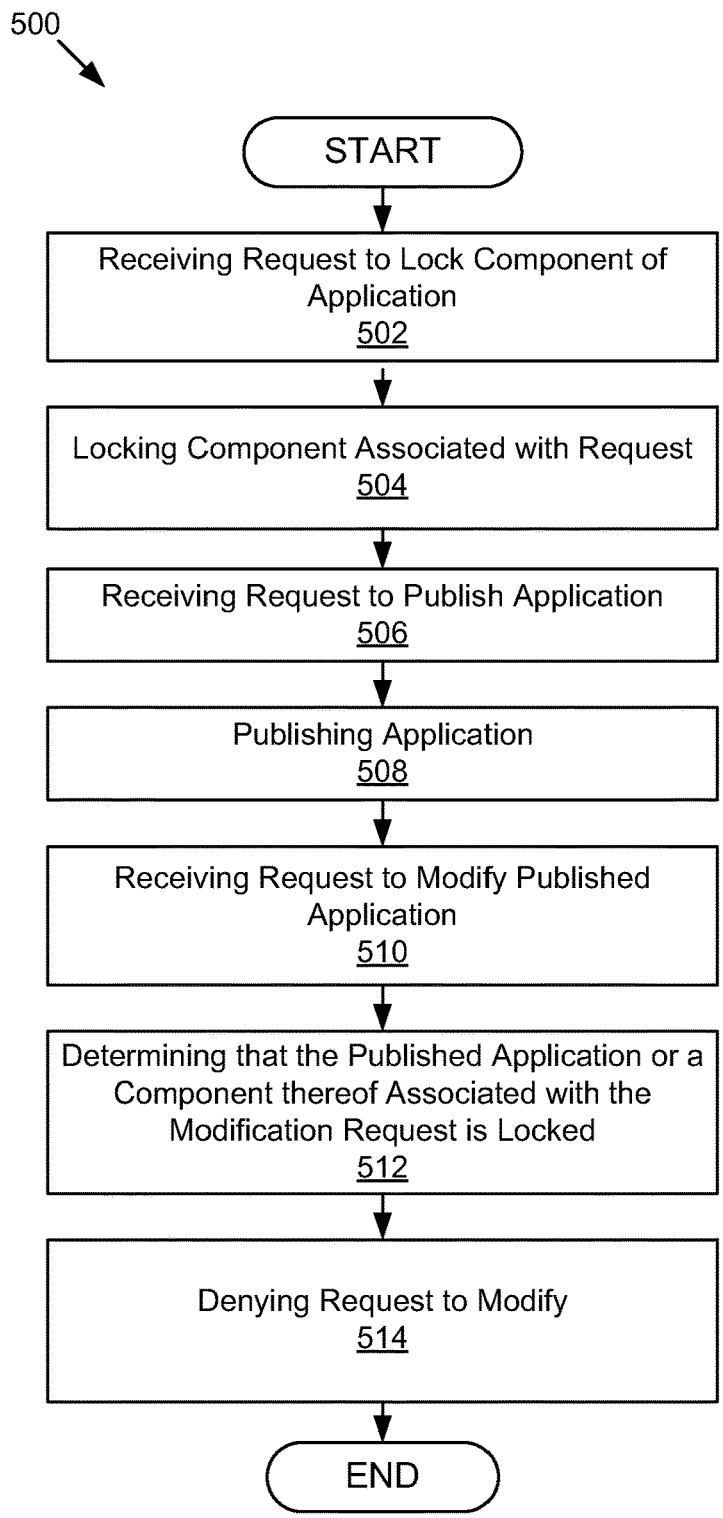
FIG. 5 is a flowchart of an example method for granular locking of an application according to one embodiment.

FIG. 5 depicts a method 500 performed by the system described above in reference to FIGS. 1-3.

Referring to FIG. 5 an example method 500 for granular locking within an application according to one embodiment is shown. At block 502, the locking module 332 receives a request to lock a component of the web-based application 126. For example, the locking module 332 receives an indication that a locking selection element is selected/unselected. At block 504, the locking module 322 locks the component associated with the request received at block 502. For example, when the component is a tab or menu, the locking module 332 locks the tab or menu. In another example, when the component is an object component (e.g. a field), the locking module 332 locks the object component. In yet another example, when the component is a relationship, the locking module 332 locks the relationship. In one embodiment, the locking module 332 locks an application by updating locking information.

At block 508, the publication module 330 publishes the web-based application 126 based on locking information. At block 510, the development application 124 receives a request to modify a published application. At block 512, the development application 124 determines that the published application as a whole or the component associated with the modification request was locked prior to publication and denies the request to modify at block 514.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:
1. A method comprising:
receiving, by a model driven development application of an application server, a selection of a developer-selectable graphical user interface (GUI) element from a developer, the developer-selectable GUI element dedicated to setting a locking status of a component of a web-based application associated with the developer selectable GUI element, the web-based application being developed using the model driven development application and comprising a plurality of components organized in a hierarchical structure;
determining that the component of the web-based application associated with the selected, developer-selectable GUI element includes a subcomponent in the hierarchical structure;
responsive to the selection of the developer-selectable GUI element setting the locking status of the component of the web-based application associated with the developer-selectable GUI element and automatically applying the locking status of the component of the web-based application associated with the selected, developer-selectable GUI element to the subcomponent;
applying, by the model driven development application of the application server, the locking status to the component of the web-based application being developed using the model driven development application, the locking status persisting after completion of the web-based application's development and determining whether the component associated with the selected, developer-selectable GUI element is modifiable by another tenant after completion of the web-based application's development;

publishing, by the model driven development application of the application server, the web-based application for installation by the another tenant upon completion of the web-based application's development, the web-based application including information about the locking status of the component set by the developer during development of the web-based application based on the selection of the developer-selectable GUI element, the locking status persisting after completion of the web-based application's development and thereby determining whether the component of the web-based application may be modified by the another tenant after completion of the web-based application's development and installation of the web-based application by the another tenant, wherein the another tenant is an end-user of the web-based application or associated with a customer entity;

receiving, by the model driven development application of the application server after completion of the web-based application's development, a request from an administrative user of the another tenant to modify the component of the web-based application;

determining, by the model driven development application of the application server, whether the request is to modify a locked or unlocked component of the web-based application;

modifying, by the model driven development application of the application server, the requested component of the web-based application responsive to determining that the requested component is unlocked; and denying, by the model driven development application of the application server, modification of the requested component of the web-based application responsive to determining that the requested component is locked.

2. A method comprising:

receiving, by a model driven development application of an application server, a selection of a developer-selectable graphical user interface (GUI) element from a developer, the developer-selectable GUI element dedicated to setting a locking status of a component of a web-based application associated with the developer-selectable GUI element, the web-based application being developed using the model driven development application and comprising a plurality of components organized in a hierarchical structure;

determining that the component of the web-based application associated with the selected, developer-selectable GUI element includes a subcomponent in the hierarchical structure;

responsive to the selection of the developer-selectable GUI element setting the locking status of the component of the web-based application associated with the developer-selectable GUI element and automatically applying the locking status of the component of the web-based application associated with the selected, developer-selectable GUI element to the subcomponent;

applying, by the model driven development application of the application server, the locking status to the component of the web-based application being developed using the model driven development application, the locking status persisting after completion of the web-based application's development and determining whether the component associated with the selected, developer-selectable GUI element is modifiable by another tenant after completion of the web-based application's development; and publishing, by the model driven development application of the application server, the web-based application for installation by the another tenant upon completion of the web-based application's development, the web-based application including information about the locking status of the component set by the developer during development of the web-based application based on the selection of the developer-selectable GUI element, the locking status persisting after completion of the web-based application's development and thereby determining whether the component of the web-based application may be modified by the another tenant after completion of the web-based application's development and installation of the web-based application by the another tenant, wherein the another tenant is an end-user or associated or associated with a customer entity.

3. The method of claim 2, wherein the component is one of a tab, a menu below the tab, a submenu below the menu, an object component and a relationship between two or more objects, and wherein the developer-selectable GUI element is one of a radio button, check-box, and icon.

4. The method of claim 2, the method including:

providing, to the developer, a plurality of developer-selectable GUI elements, each developer-selectable GUI element associated with a lockable/unlockable component subcomponent within the hierarchical structure of the web-based application and allowing the developer to explicitly select the locking status of the associated component or subcomponent within the hierarchical structure of the web-based application within the hierarchical structure using the developer-selectable GUI element associated with the component or subcomponent of the web-based application.

5. The method of claim 2, wherein a second component includes a first subcomponent that is locked based on a first developer-selectable GUI element dedicated to setting a locking status of the first subcomponent of the web-based application and associated with the first developer-selectable GUI element and a second subcomponent that is unlocked based on a second developer-selectable GUI element dedicated to setting a locking status of the second subcomponent of the web-based application and associated with the second developer-selectable GUI element.

6. The method of claim 2 including:

receiving, by the model driven development application of the application server, a request from an administrative user of the another tenant to modify the component of the web-based application;

determining, by the model driven development application of the application server, whether the request is to modify a locked or unlocked component of the web-based application;

modifying, by the model driven development application of the application server, the requested component of the web-based application responsive to determining that the requested component is unlocked; and denying, by the model driven development application of the application server, modification of the requested component of the web-based application responsive to determining that the requested component is locked.

7. The method of claim 2, wherein an update to the web-based application from the developer overwrites modifications to unlocked components of the web-based application made by administrative end-user.

8. The method of claim 2, wherein the another tenant may not modify the locking status.

9. A system comprising:
one or more processors; and
a memory storing instructions that, when executed by the one or more processors, cause the system to:
receive a selection of a developer-selectable graphical user interface (GUI) element from a developer, the developer-selectable GUI element dedicated to setting a locking status of a component of a web-based application associated with the developer-selectable GUI element, the web-based application being developed using a model driven development application and comprising a plurality of components organized in a hierarchical structure;
determine that the component of the web-based application associated with the selected, developer-selectable GUI element includes a subcomponent in the hierarchical structure;
responsive to the selection of the developer-selectable GUI element setting the locking status of a component of the web-based application associated with the developer-selectable GUI element and automatically apply the locking status of the component of the web-based application associated with the selected, developer-selectable GUI element to the subcomponent;
apply the locking status to the component of the web-based application being developed using the model driven development application, the locking status persisting after completion of the web-based application's development and determining whether the component associated with the selected, developer-selectable GUI element is modifiable by another tenant after completion of the web-based application's development; and
publish the web-based application for installation by the another tenant upon completion of the web-based application's development, the web-based application including information about the locking status of the component set by the developer during development of the web-based application based on the selection of the dedicated developer-selectable GUI element, the locking status persisting after completion of the web-based application's development and thereby determining whether the component of the web-based application may be modified by the another tenant after completion of the web-based application's development and installation of the web-based application by the another tenant, wherein the another tenant is an end-user or associated or associated with a customer entity.

10. The system of claim 9, wherein the component is one of a tab, a menu below the tab, a submenu below the menu, an object component and a relationship between two or more objects, and wherein the developer-selectable GUI element is one of a radio button, check-box, and icon.

11. The system of claim 9, the system including instructions that, when executed by the one or more processors, cause the system to:
provide a plurality of developer-selectable GUI elements, each developer-selectable GUI associated with a lockable/unlockable component or subcomponent within the hierarchical structure of the web-based application and allowing the developer to explicitly select the locking status of the associated component or subcomponent of the web-based application within the hierarchical structure using the developer-selectable GUI element associated with the component or subcomponent of the web-based application.

12. The system of claim 9, wherein a second component includes a first subcomponent that is locked based on a first developer-selectable GUI element dedicated to setting a locking status of the first subcomponent of the web-based application and associated with the first developer-selectable GUI element and a second subcomponent that is unlocked based on a second-developer selectable GUI element dedicated to setting a locking status of the second subcomponent of the web-based application and associated with the second developer-selectable GUI element.

13. The system of claim 9, wherein the instructions, when executed by the one or more processors, causing the system to:
receive a request from an administrative user of the another tenant to modify the component of the web-based application; to determine whether the request is to modify a locked or unlocked component of the web-based application; to modify the requested component of the web-based application responsive to determining that the requested component is unlocked; and to deny modification of the requested component of the web-based application responsive to determining that the requested component is locked.

14. The system of claim 9, wherein an update to the web-based application from the developer overwrites modifications to unlocked components of the web-based application made by administrative end-user.

15. The system of claim 9, wherein the another tenant may not modify a locking status.

* * * * *